No. 686,361. Patented Nov. 12, 1901.
H. SPURRIER, JR.
DRIVING GEAR FOR MOTOR VEHICLES.
(Application filed Aug. 3, 1901.)
(No Model.) 3 Sheets—Sheet 1.
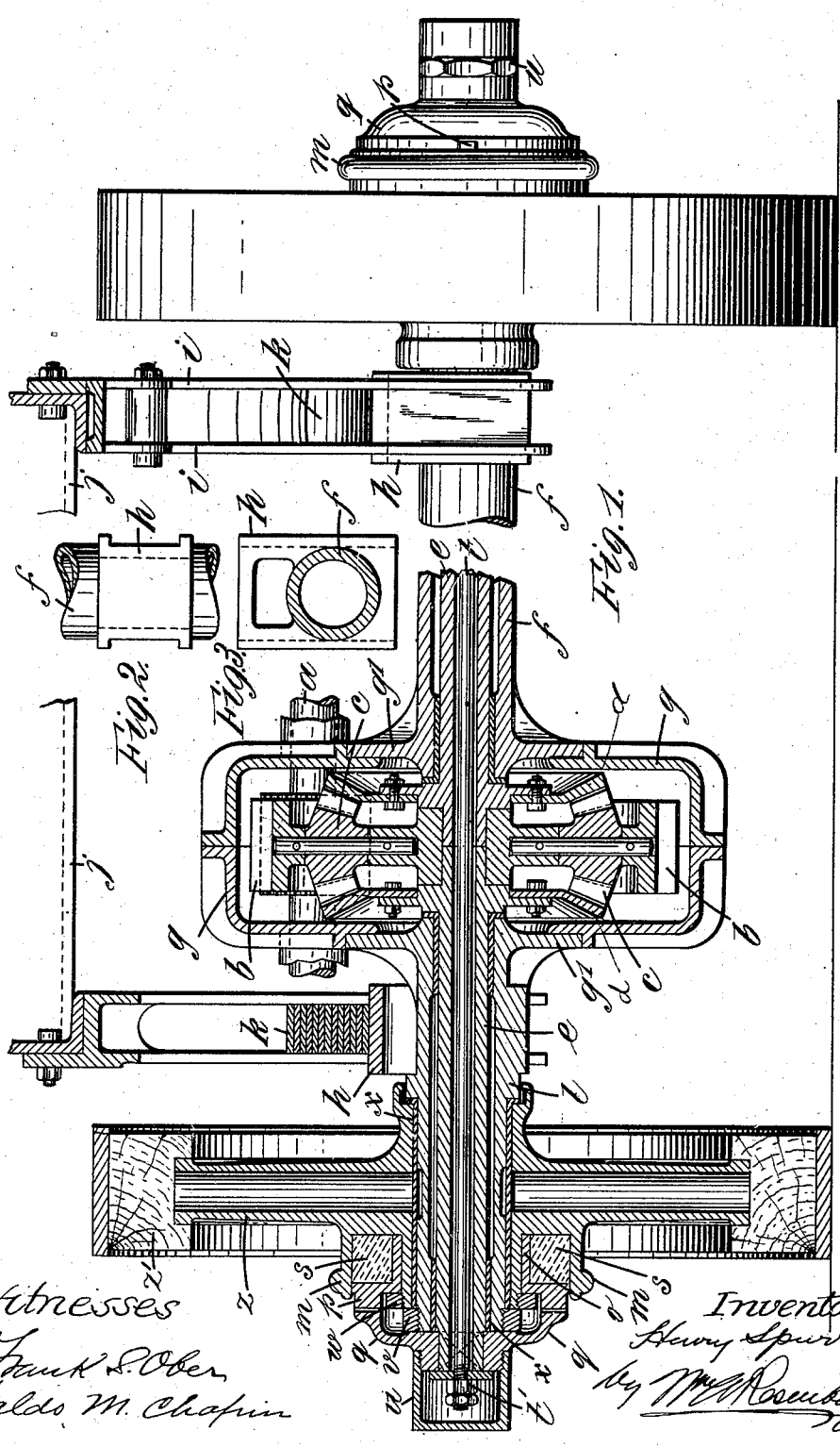

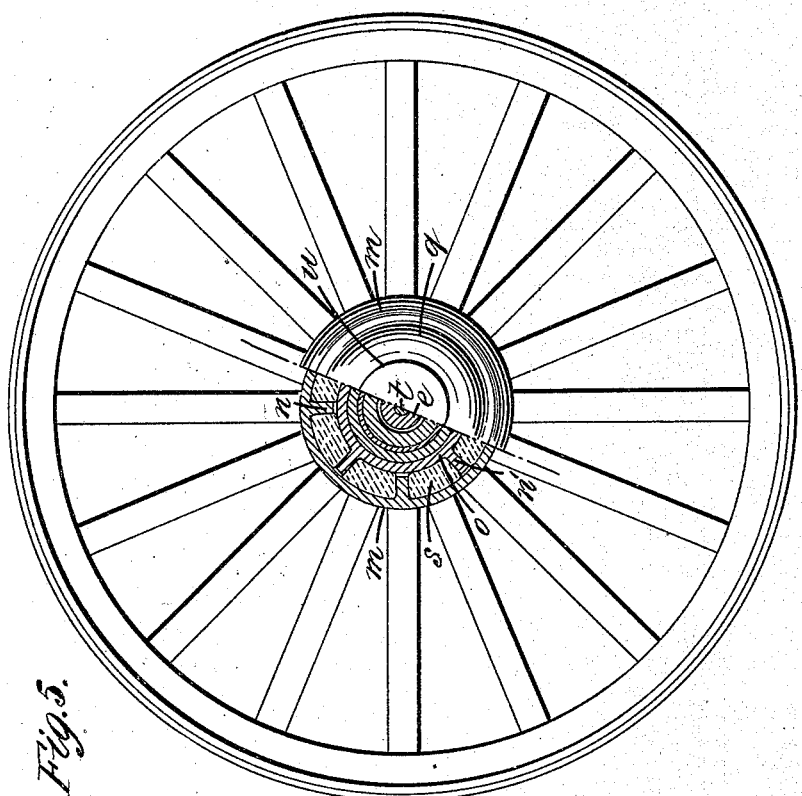
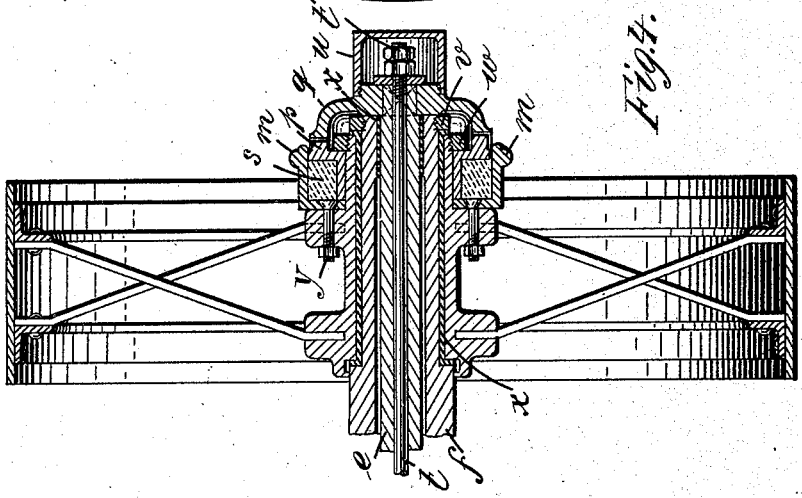

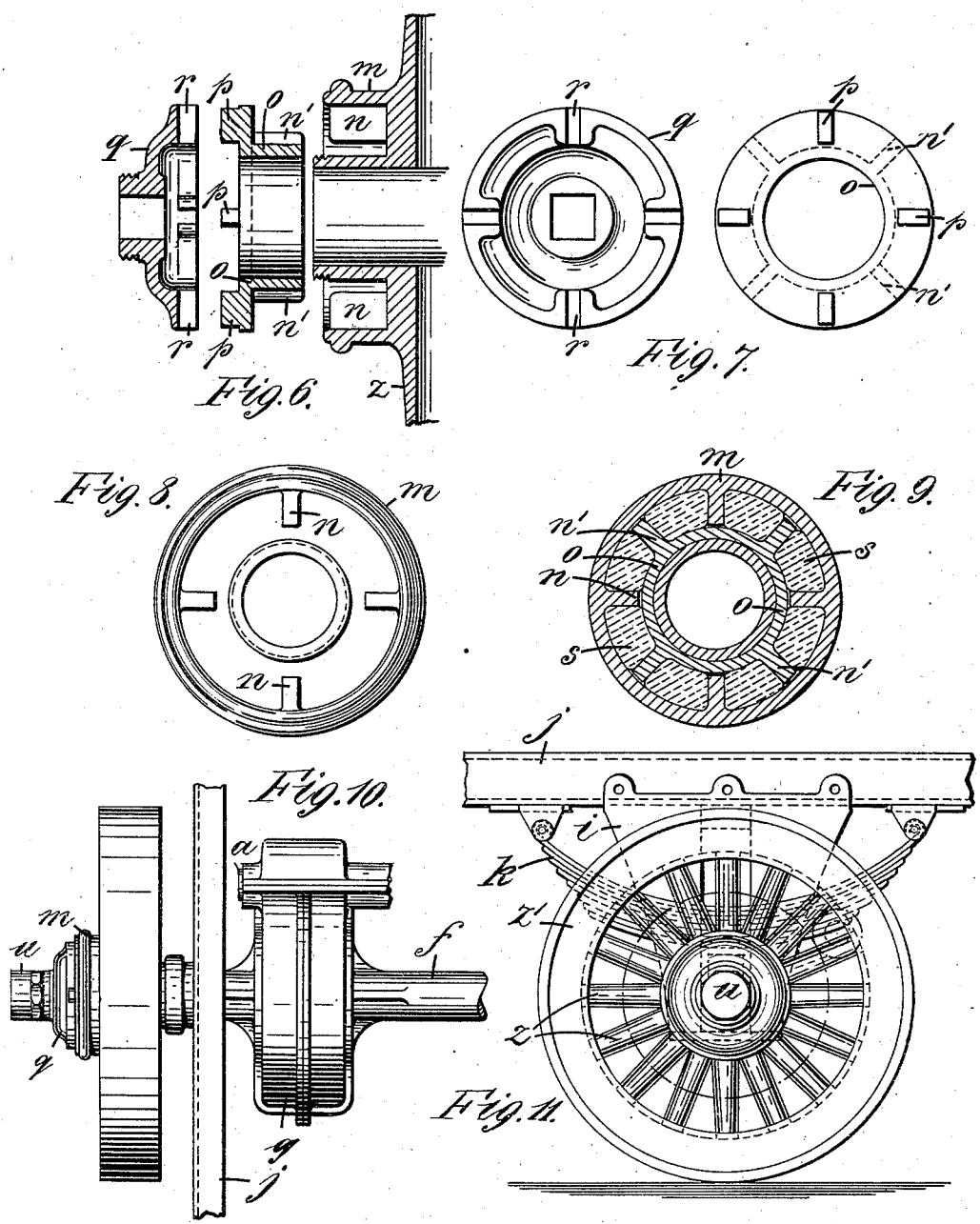

UNITED STATES PATENT OFFICE.

HENRY SPURRIER, JR., OF ST. ANNES-ON-THE-SEA, ENGLAND.

DRIVING-GEAR FOR MOTOR-VEHICLES.

SPECIFICATION forming part of Letters Patent No. 686,361, dated November 12, 1901.

Application filed August 3, 1901. Serial No. 70,731. (No model.)

*To all whom it may concern:*

Be it known that I, HENRY SPURRIER, Jr., a citizen of the British Empire, residing at St. Annes-on-the-Sea, in the county of Lancaster, England, have invented certain new and useful Improvements in Driving-Gear for Motor-Vehicles, of which the following is a full, clear, and exact description.

This invention relates to improvements in the means employed for transmitting rotary motion to the wheels of mechanically-propelled road-vehicles, some of the results of their adoption being that the risks which attend the rigid connection of the driving-wheels with the driving-shaft are avoided and that the compensating or balance gearing is more perfectly protected from mud, dust, and injury.

According to my present invention I use a transversely-divided driving-shaft with compensating gearing of known construction mounted over the sectional division in the usual manner. Each end of the driving-shaft projects through the hub of its wheel, outside which it is fixed to a buffer-box through the buffers, wherein the torque is transmitted to the wheel. Each driving-wheel is mounted but not fixed upon a hollow axle concentric with the driving-shaft contained within it. The hollow axle is expanded to form a casing for the compensating gear.

I will further describe my said invention with reference to the accompanying drawings, in which—

Figure 1 represents, partly in vertical section and partly in end elevation, a pair of driving-wheels and the mechanism through which motion is transmitted to them. A part of the axle is supposed to be broken away to reduce the length of the figure. Fig. 2 shows a plan, and Fig. 3 a side elevation, of one of the spring-blocks. Fig. 4 illustrates in longitudinal section a modification of the buffer-box. Fig. 5 illustrates, partly in elevation and partly in transverse section, the modification shown in Fig. 4. Fig. 6 shows in longitudinal section the three essential metallic elements of a buffer-box, and Fig. 7 the opposing faces of the two outer elements. Fig. 8 shows an elevation of the inner element of the buffer-box; and Fig. 9, a transverse section through the complete buffer-box and buffers, taken parallel with the wheel-spokes. Fig. 10 represents one of the driving-wheels and the expanded part of the axle in plan. Fig. 11 represents the same wheel in side elevation.

Motion is transmitted from the motor carried by the vehicle by any usual means to the shaft $a$, which has a toothed pinion thereon gearing with the spur-wheel $b$ of the balance-gearing, which comprises the usual bevel-pinion $c\ c$, mounted in the spur-wheel, and the bevel-wheels $d\ d$, respectively fixed upon the driving-shaft $e$. This driving-shaft is hollow, for the reason hereinafter indicated, and is transversely divided in the center plane of the spur-wheel $b$. It extends through the hub of each driving-wheel and is formed with square or non-circular ends. The driving-shaft is contained within the tubular axle $f$, which is slightly shorter than the divided driving-shaft and has an expanded part $g$, which contains the balance-gear. This part may be variously constructed in such a manner that access may be had to the contained gearing. Thus, as shown by Fig. 1, the tubular part of the axle may be produced in two separate parts, each of which has a flange $g'$ near its inner end. The expanded part $g$ also is formed in two or more parts, which are secured together by bolts and nuts, by which means also the expanded part $g$ may be secured upon the flanges $g'\ g'$. It will be borne in mind that the axle does not rotate, and it may therefore have formed integrally with it the spring-blocks $h\ h$, in which there are recesses to receive the horn-plates $i\ i$, on which the under frame $j$ of the vehicle is carried and between which the springs $k\ k$ are contained. The hub of each wheel abuts by its inner face against a shoulder $l$ on the axle and has such a thickness that its outer extremity is a little short of the length of the axle. There is formed or secured on the outer face of each wheel-hub an annular projection $m$ with integral radial internal wings $n\ n$, Figs. 6 and 8. Within this fits upon a tubular part of the hub the flanged hoop $o$, which has a corresponding number of external radial wings $n'$, which come between the wings $n\ n$ of the annular projection $m$, and which has also on its flanged part the teeth or projections $p\ p$. Outside the hoop $o$ there is a dished plate $q$, which fits upon the non-circular end of the driving-shaft and is therefore compelled to rotate therewith. The inner face of this plate has recesses r corresponding with and fitting upon the teeth p p, thus communicating motion to the flanged hoop o. India-rubber blocks s s are fitted between the wings n and n', and motion is transmitted through these blocks only to the hub and wheel. Owing to the elastic nature of these blocks, shocks either are entirely absorbed by them or are greatly diminished. They have the further advantage that thereby the starting of the vehicle is rendered easier and more certain. The buffer-blocks being entirely inclosed are preserved from injury and the entry of mud and dust is avoided.

The two parts of the divided driving-shaft are held together by the tension-rod t, screwed at its outer ends and fitted there with the washer and nuts t', which are inclosed by the cap-nut u, screwed upon the dished plate q. Movement of the hub outward is prevented by the screw-nut v on the end of the axle f, and the hoop o is held in place by the screw-nut w on the end of the tubular part of the hub. Brass liners x x are arranged between the moving and stationary parts to reduce friction.

When it is inconvenient to form the annular part m integrally with the hub of the wheel, it may be separately formed and be bolted upon the hub by the bolts y, as indicated in Fig. 5.

The construction of the wheels illustrated by Figs. 1 and 11 shows hollow tubular spokes Z, which are fitted within the wooden felly Z', upon which the usual steel rim is shrunk and fastened. The wheel illustrated by Figs. 5 and 6 is of the customary traction-engine type, so far as the outer portions are concerned.

What I claim as my invention, and desire to secure by Letters Patent, is—

1. In motor-vehicles for common roads, the combination with a divided driving-shaft, of a stationary hollow axle external thereto and concentric therewith, an expanded part of the axle containing the balance-gearing, an axial tension-rod passing through the driving-shaft and holding its parts together, a recessed dished plate on each end of the driving-shaft, a flanged hoop fitting upon a tubular part of each driving-wheel hub and having projections on its flange to engage the recesses of the dished plate and external radial wings on its hoop, an annular projection from the hub having internal radial wings coming between the wings of the flanged hoop, and india-rubber blocks between the said wings, substantially as and for the purpose set forth.

2. In motor-vehicles for common roads, a stationary hollow axle upon which the wheels rotate, a hollow divided driving-shaft contained within the hollow axle, and extending through the wheels, a tension-rod contained within the hollow divided driving-shaft, and an enlarged part of the hollow axle incasing the balance-gearing.

3. In motor-vehicles for common roads, the combination with each driving-wheel of a recessed dished plate moving with the driving-shaft, a flanged hoop fitting upon a tubular part of the wheel-hub and having projections on its flange to engage the recesses of the dished plate and having also external radial wings on its hoop, an annular projection from the wheel-hub having internal radial wings coming between the wings of the flanged hoop, and india-rubber blocks between the said wings.

In witness whereof I have subscribed my signature in presence of two witnesses.

HENRY SPURRIER, JUNR.

Witnesses:
WILLIAM E. HEYS,
ARTHUR MILLWARD.